US010069719B2

(12) United States Patent
Kolan et al.

(10) Patent No.: US 10,069,719 B2
(45) Date of Patent: Sep. 4, 2018

(54) METHOD AND APPARATUS FOR MULTIPATH MEDIA DELIVERY

(71) Applicant: Samsung Electronics Co., Ltd., Suwon-si, Gyeonggi-do (KR)

(72) Inventors: Prakash Kolan, Mountain View, CA (US); Imed Bouazizi, Mountain View, CA (US)

(73) Assignee: Samsung Electronics Co., Ltd., Suwon-Si (KR)

( * ) Notice: Subject to any disclaimer, the term of this patent is extended or adjusted under 35 U.S.C. 154(b) by 237 days.

(21) Appl. No.: 15/001,018

(22) Filed: Jan. 19, 2016

(65) Prior Publication Data
US 2016/0373342 A1    Dec. 22, 2016

Related U.S. Application Data

(60) Provisional application No. 62/180,404, filed on Jun. 16, 2015.

(51) Int. Cl.
*G06F 15/173* (2006.01)
*H04L 12/707* (2013.01)

(52) U.S. Cl.
CPC .................................. *H04L 45/24* (2013.01)

(58) Field of Classification Search
USPC ................ 709/203, 219, 223, 227, 232, 238
See application file for complete search history.

(56) References Cited

U.S. PATENT DOCUMENTS

| 8,670,326 | B1* | 3/2014 | Balasubramanian ... H04L 45/22 370/238 |
| 8,755,389 | B1 | 6/2014 | Poutievski et al. |
| 8,929,386 | B2 | 1/2015 | Lee et al. |
| 9,456,464 | B2 | 9/2016 | Biswas et al. |
| 9,681,481 | B2* | 6/2017 | Liu .................... H04W 76/025 |
| 2008/0192728 | A1* | 8/2008 | Levesque ........... H04L 12/1836 370/352 |
| 2011/0082951 | A1 | 4/2011 | Hardy et al. |

(Continued)

FOREIGN PATENT DOCUMENTS

KR    10-2014-0095445 A    8/2014
WO         2013059683 A1    4/2013

OTHER PUBLICATIONS

International Search Report dated Sep. 20, 2016 in connection with International Application No. PCT/KR2016/006252, 3 pages.

(Continued)

*Primary Examiner* — Liangche A Wang (57) ABSTRACT

A method, client device, and server for multipath data packet transmission and reception. The method for multipath data packet reception includes transmitting, by the client device, a message to the server. The message includes an identifier that is unique to a multipath transmission session and that identifies a group of two or more network access interfaces of the client device to receive one or more data packets from the server during the multipath transmission session. The method also includes receiving, by the client device, the one or more data packets from the server through each of the two or more network access interfaces of the client device during the multipath transmission session based on one or more characteristics of the two or more network access interfaces.

21 Claims, 8 Drawing Sheets

(56) References Cited

U.S. PATENT DOCUMENTS

| | | | |
|---|---|---|---|
| 2013/0232534 A1* | 9/2013 | Salkintzis | H04W 76/026 725/116 |
| 2015/0032860 A1 | 1/2015 | Delangis | |
| 2015/0245409 A1* | 8/2015 | Medapalli | H04W 76/04 370/329 |
| 2015/0296231 A1 | 10/2015 | Kwon et al. | |
| 2017/0231018 A1* | 8/2017 | Hahn | H04L 61/2007 |

OTHER PUBLICATIONS

Written Opinion of the International Searching Authority dated Sep. 20, 2016 in connection with International Application No. PCT/KR2016/006252, 7 pages.

M. Kazemi, S. Shirmohammadi, K.H. Sadeghi, "A review of multiple description coding techniques for error-resilient video delivery", Multimedia Systems, vol. 20, Issue 3, pp. 283-309, Jun. 2014.

Z. Liu, G. Cheung, J. Chakareski, Y. Ji, "Multiple Description Coding and Recovery of Free Viewpoint Video for Wireless Multi-Path Streaming", IEEE Journal of Selected Topics in Signal Processing, vol. 9, No. 1, Feb. 2015, 14 pgs.

J. Chakareski, S. Han, B. Girod, "Layered Coding vs. Multiple Descriptions for Videostreaming over Multiple Paths", Proc. of ACM Multimedia, pp. 422-431, 2003.

V. Singh, S. Ahsan, J. Ott, "MPRTP: Multipath considerations for real-time media", Proc. of ACM Multimedia Systems, 2013, 12 pgs.

G. Sun, U. Samarawickrama, J. Liang, C. Tian, C. Tu and T. D. Tran "Multiple description coding with prediction compensation", IEEE Trans. ImageProcess., vol. 18, No. 5, pp. 1037-1047, 2009.

Y. Ding, Y. Yang, L. Xiao, "Multi-path Routing and Rate Allocation for Multi-Source video On-demand Streaming in Wireless Mesh Networks", Proc. IEEE Infocom, pp. 2051-2059, 2011.

C. Xu, Z. Li, J. Li, H. Zhang, G. Muntean, Cross-layer Fairness-driven Concurrent Multipath Video Delivery over Heterogenous Wireless Network, IEEE Transactions on Circuits and Systems for Video Technology, Dec. 2014, 15 pgs.

L. Zhang, M. Hauswirth, Z. Zhou, V. Reynolds, G. Han, "Multi-priority Multi-Path Selection for Video Streaming in Wireless Multimedia Sensor Networks", Fifth International conference on Ubiquitous Intelligence and Computing (UIC 2008), Oslo, Norway, Jun. 2008, 14 pgs.

W. Wei, A. Zakhor, "Interference Aware Multipath Selection for Video Streaming in Wireless Adhoc Networks", IEEE Transactions on Circuits and Systems for Video Technology, vol. 19, No. 2, pp. 165-178, 2009.

Extended European Search Report regarding Application No. 16811881.8, dated May 18, 2018, 10 pages.

Lei et al., "Multipath RTP based on RT Relay Application (MPRTP-RA)", AVT Core Working Group, Mar. 12, 2013, 42 pages.

Li et al., "A Multipath Relay Transport Control Method for Real-time Video Service", 2015 IEEE International Conference on Cyber Technology in Automation, Control and Intelligent Systems, Jun. 2015, pp. 756-760.

So et al., "Text Update to MMT Amd2", ISO/IEC JTC1/SC29/WG11 MPEG2016/m38599, May 2016, 32 pages.

Kwon et al., "Multimedia Transport Protocol using Multiple Paths over Heterogeneous Wireless Networks", 2014 International Conference on Information and Communication Technology Convergence (ICTC 2014), Oct. 2014, pp. 157-158.

* cited by examiner

METHOD AND APPARATUS FOR MULTIPATH MEDIA DELIVERY

CROSS-REFERENCE TO RELATED APPLICATION(S) AND CLAIM OF PRIORITY

The present application claims priority to U.S. Provisional Patent Application Ser. No. 62/180,404, filed Jun. 16, 2015, entitled "METHOD AND APPARATUS FOR MULTIPATH MEDIA DELIVERY". The content of the above-identified patent document is incorporated herein by reference in its entirety.

TECHNICAL FIELD

The present application relates generally to multimedia transmission and, more specifically, to a multimedia transmission routing.

BACKGROUND

Multimedia streaming technologies such as MPEG media transport protocol (MMTP) use services of the transport layer to stream packets from a source such as a MPEG media transport (MMT) sender to a destination such as an MMT receiver. In all cases, the transport layer chooses a network interface which can be configured as a default interface for sending the packets to the destination. Due to the problems in the network connected to the chosen network interface, the packets can be delayed, lost, or received with varying jitter by the receiver. This results in obvious quality of service (QoS) and quality of experience (QoE) issues at the receiver. In addition, dynamic changes in network conditions such as unexpected packet loss, congestion, and the like of the network path can lead to quality degradation.

SUMMARY

A client device for multipath data packet reception is provided. The client device includes a processor and a group of two or more network access interfaces. The processor is configured to control a transmission of a message to a server. The message includes an identifier that is unique to a multipath transmission session and that identifies a group of two or more network access interfaces of the client device to receive one or more data packets from the server during the multipath transmission session. The processor is also configured to control a reception of the one or more data packets from the server through each of the two or more network access interfaces of the client device during the multipath transmission session based on one or more characteristics of the two or more network access interfaces.

A server is provided. The server includes a processor. The processor is configured to control a reception of a message from a client device. The message includes an identifier that is unique to a multipath transmission session and that identifies a group of two or more network access interfaces of the client device to receive one or more data packets from the server during the multipath transmission session. The processor is also configured to control a transmission of the one or more data packets to the client device through each of the two or more network access interfaces of the client device during the multipath transmission session based on one or more characteristics of the two or more network access interfaces.

A method implemented using a client device for multipath data packet reception is provided. The method includes transmitting, by the client device, a message to a server. The message includes an identifier that is unique to a multipath transmission session and that identifies a group of two or more network access interfaces of the client device to receive one or more data packets from the server during the multipath transmission session. The method also includes receiving, by the client device, the one or more data packets from the server through each of the two or more network access interfaces of the client device during the multipath transmission session based on one or more characteristics of the two or more network access interfaces.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 8, discussed below, and the various embodiments used to describe the principles of the present invention in this patent document are by way of illustration only and should not be construed in any way to limit the scope of the disclosure. Those skilled in the art will understand that the principles of this disclosure may be implemented in any suitably arranged device or system.

The following documents and standards descriptions are hereby incorporated by reference into the present disclosure as if fully set forth herein: "Study of ISO/IEC CD 23008-1 MPEG Media Transport", MPEG-H Systems, ISO/IEC JTC1/SC29/WG11, October 2012 ("REF. 1"); "MPEG Media Transport Protocol (MMTP)", IETF Draft, https://tools.ietf.org/id/draft-bouazizi-mmtp-01.txt, September 2014 ("REF. 2"); "Real Time Streaming Protocol (RTSP)", RFC 2326, https://www.ietf.org/rfc/rfc2326.txt, April 1998 ("REF. 3"); "Hypertext Transfer Protocol—HTTP/1.0", RFC 1945, http://tools.ietf.org/html/rfc1945, May 1996 ("REF. 4"); "Hypertext Transfer Protocol—HTTP/1.1", RFC 2616, http://www.w3.org/Protocols/rfc2616/rfc2616.txt, June 1999 ("REF. 5"); "Hypertext Transfer Protocol (HTTP/1.1): Message Syntax and Routing", RFC 7230, https://tools.ietf.org/html/rfc7230, June 2014 ("REF. 6"); "Hypertext Transfer Protocol (HTTP/1.1): Semantics and Content", RFC 7231, https://tools.ietf.org/html/rfc7231 ("REF. 7"); "SDP: Session Description Protocol", RFC 4566, https://tools.ietf.org/html/rfc4566, July 2006 ("REF. 8"); "Grouping of Media Lines in the Session Description Protocol (SDP)", RFC 3388, https://tools.ietf.org/html/rfc3388 ("REF. 9"); "The Session Description Protocol (SDP) Grouping Framework", RFC 5888, https://tools.ietf.org/html/rfc5888 ("REF. 10"); "The WebSocket Protocol", RFC 6455, https://tools.ietf.org/html/rfc6455 ("REF. 11"); "SDP Descriptors for MMTP", IETF Draft, https://tools.ietf.org/html/draft-bouazizi-sdp-descriptors-mmtp-00 ("REF. 12"); M. Kazemi, S. Shirmohammadi, K. H. Sadeghi, "A review of multiple description coding techniques for error-resilient video delivery", Multimedia Systems, Volume 20, Issue 3, pp 283-309, June 2014 ("REF. 13"); Z. Liu, G. Cheung, J. Chakareski, Y. Ji, "Multiple Description Coding and Recovery of Free Viewpoint Video for Wireless Multi-Path Streaming", IEEE Journal Of Selected Topics In Signal Processing, Vol. 9, No. 1, February 2015 ("REF. 14"); J. Chakareski, S. Han, B. Girod, "Layered Coding vs. Multiple Descriptions for Videostreaming over Multiple Paths", Proc. of ACM Multimedia, pp. 422-431, 2003 ("REF. 15"); V. Singh, S. Ahsan, J. Ott, "MPRTP: Multipath considerations for real-time media", Proc. of ACM Multimedia Systems, 2013 ("REF. 16"); G. Sun, U. Samarawickrama, J. Liang, C. Tian, C. Tu and T. D. Tran "Multipledescription coding with prediction compensation", IEEE Trans. ImageProcess., vol. 18, no. 5, pp. 1037-1047, 2009 ("REF. 17"); Y. Ding, Y. Yang, L. Xiao, "Multi-path Routing and Rate Allocation for Multi-Sourcevideo On-demand Streaming in Wireless Mesh Networks", Proc. IEEE INFOCOM, pp. 2051-2059, 2011 ("REF. 18"); C. Xu, Z. Li, J. Li, H. Zhang, G. Muntean, "Cross-layer Fairness-driven Concurrent Multipath Video Delivery over Heterogenous Wireless Network, IEEE Transactions on Circuits and Systems for Video Technology, December 2014 ("REF. 19"); L. Zhang, M. Hauswirth, Z. Thou, V. Reynolds, G. Han, "Multi-priority Multi-Path Selection for Video Streaming in Wireless Multimedia Sensor Networks", Fifth International conference on Ubiquitous Intelligence and Computing (UIC 2008), Oslo, Norway, June 2008 ("REF. 20"), and W. Wei, A. Zakhor, "Interference Aware Multipath Selection for Video Streaming in Wireless Adhoc Networks", IEEE Transactions On Circuits and Systems for Video Technology, vol. 19, no. 2, pp. 165-178, 2009 ("REF. 21").

Multimedia streaming technologies (and applications) can be network agnostic and rely on lower layer services (such as the transport layer and the network layer) for streaming data to the destination. The upper layers (such as the application layer) can additionally or alternatively be involved in routing decisions and data transport. Applications can exchange information to report on QoS and QoE. Improvements can be made so that quality information can be used by the two parties in conversation to improve the data delivery.

For example, multimedia streaming applications can use multiple connections (such as connections through multiple network paths) for delivering data from a source to a destination (hence "multipath delivery") instead of using a single transport path delivering data. Mobile devices such as smartphones and tablets are equipped with multiple network access interfaces such as third generation partnership project (3GPP) radio access and wireless fidelity (WiFi) interfaces. Reusing alternative network access channels will alleviate the network overload problem and increase the number of subscribers that can be served by the mobile operator.

As another example, multimedia receiver applications can detect and report quality information of different packet flows (such as from different network paths) to the sender applications. The sender applications can use this quality information to change the network paths (such as by using different network interfaces) for subsequent packet delivery and thus avoid faulty paths. This will alleviate QoS and QoE issues at the receiver because of bad network conditions of a network path. As decisions can be made at the higher layer for different levels of granularity (such as packet level, flow level, connection level, and the like), the sender applications will have more visibility and thus more control for making better informed decisions.

Figure 1:
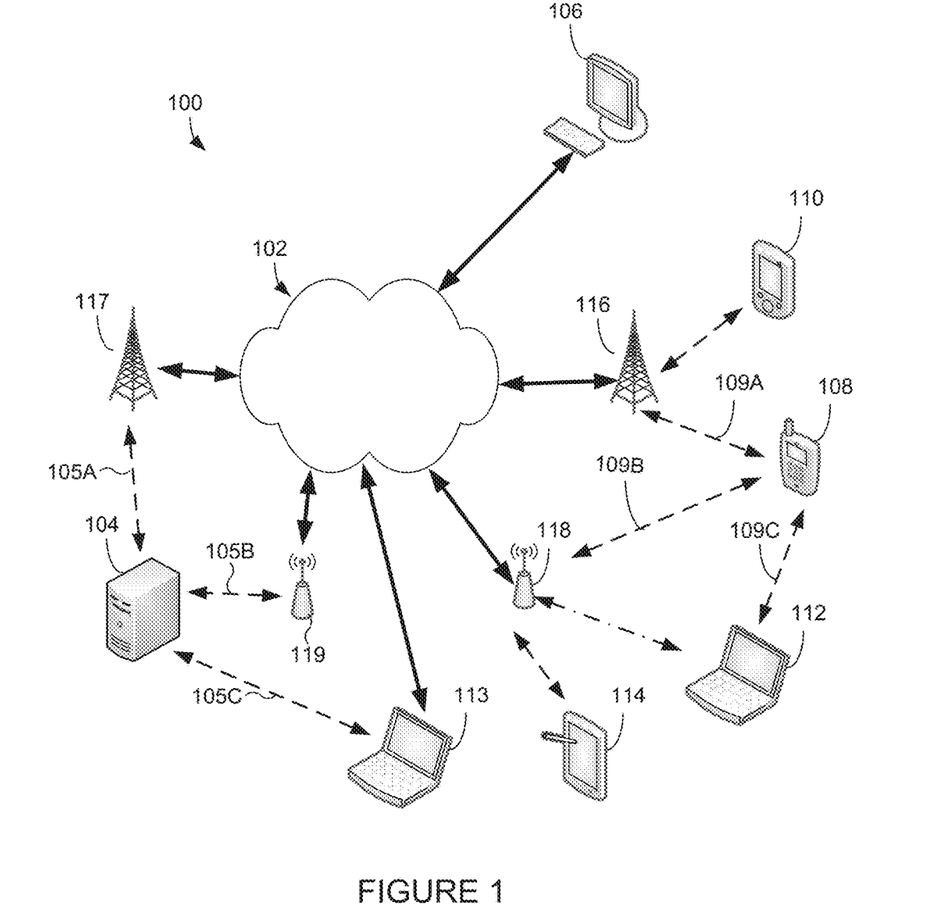
FIG. 1 illustrates an example communication system according to this disclosure.

FIG. 1 illustrates an example communication system 100 according to this disclosure. The embodiment of the communication system 100 shown in FIG. 1 is for illustration only. Other embodiments of the communication system 100 could be used without departing from the scope of this disclosure.

As shown in FIG. 1, the system 100 includes a network 102, which facilitates communication between various components in the system 100. For example, the network 102 may communicate Internet Protocol (IP) packets, frame relay frames, Asynchronous Transfer Mode (ATM) cells, or other information between network addresses. The network 102 may include one or more local area networks (LANs), metropolitan area networks (MANs), wide area networks (WANs), all or a portion of a global network such as the Internet, or any other communication system or systems at one or more locations.

The network 102 facilitates communications between at least one server 104 and various client devices 106-114. Each server 104 includes any suitable computing or processing device that can provide computing services for one or more client devices. Each server 104 could, for example, include one or more processing devices, one or more memories storing instructions and data, and one or more network interfaces facilitating communication over the network 102.

Each client device 106, 108, 110, 112, 113, and 114 represents any suitable computing or processing device that interacts with at least one server or other computing device(s) over the network 102. In this example, the client devices 106, 108, 110, 112, 113, and 114 include a desktop computer 106, a mobile telephone or smartphone 108, a personal digital assistant (PDA) 110, a laptop computer 112 and 113, and a tablet computer 114. However, any other or additional client devices could be used in the communication system 100.

In this example, some client devices 108, 110, 112, 113, and 114 communicate indirectly with the network 102. For example, the client devices 108 and 110 communicate via one or more base stations 116, such as cellular base stations or eNodeBs. Also, the client devices 112 and 114 communicate via one or more wireless access points 118, such as IEEE 802.11 wireless access points. As another example, the client device 108 can have multiple network access interfaces. Using the multiple network access interfaces, the client device 108 can communicate with the network 102 through at least one of one or more base stations 116 via network communication path 109A, one or more wireless access points 118 via network communication path 109B, or with another client device 112 via network communication path 109C.

Additionally, in this example, the server 104 can have multiple network access interfaces. Using the multiple network access interfaces, the server 104 can communicate with the network 102 through at least one of one or more base stations 117 via network communication path 105A, through one or more wireless access points 119 via network communication path 105B, or through one or more devices 113 via network communication path 105C. Note that these are for illustration only and that each client device could communicate directly with the network 102 or indirectly with the network 102 via any suitable intermediate device(s) or network(s).

As described in more detail below, a receiver (such as client device 108) can receive data packets through a plurality of specified network access interfaces via network communications paths from the transmitter. Furthermore, a transmitter (such as server 104) can transmit data packets through one or more specified network access interfaces and through one or more network communication paths to the receiver. The network access interfaces and the network communication paths can be specified for data packet communication during only a multipath transmission session initiated by at least one of the receiver or the transmitter. The receiver or the transmitter can also determine that types of data packets are to be received through specified network access interfaces of the receiver. The receiver and the transmitter can also determine a priority or ranking of data communication paths that are suitable for data packet communication based on at least one of a quality of service (QoS) parameter, a quality of experience (QoS) parameter, or other channel quality parameters.

Although FIG. 1 illustrates one example of a communication system 100, various changes may be made to FIG. 1. For example, the system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
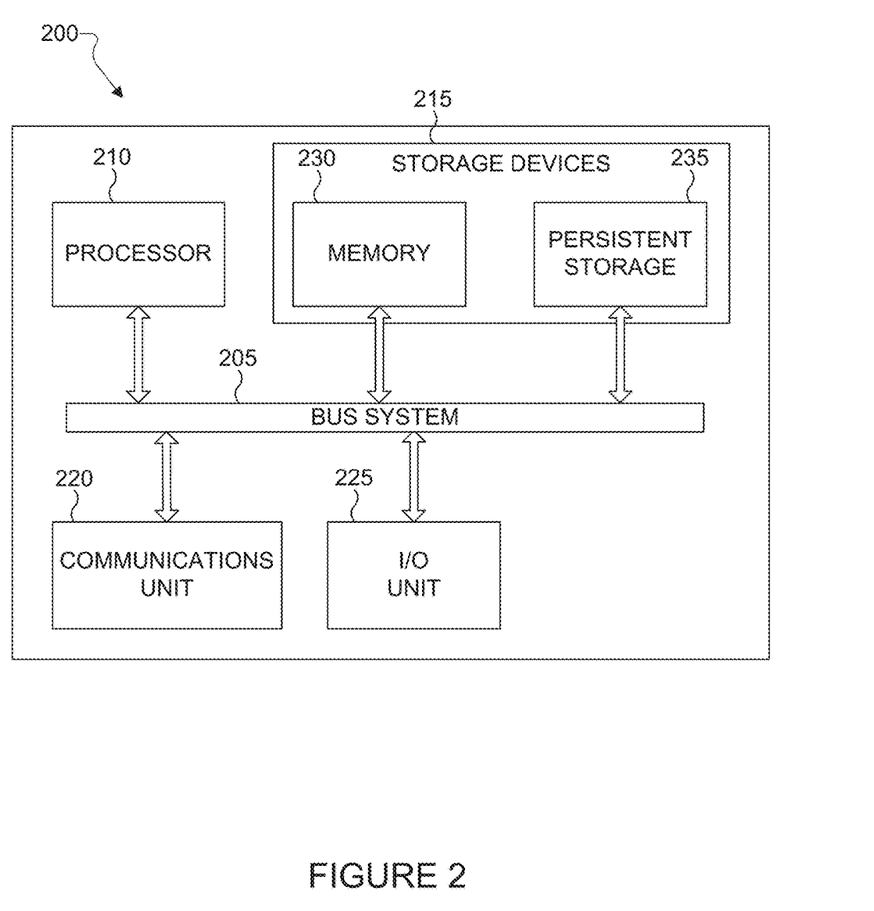
FIGS. 2 and 3 illustrate example devices in a communication system according to this disclosure.
Figure 3:
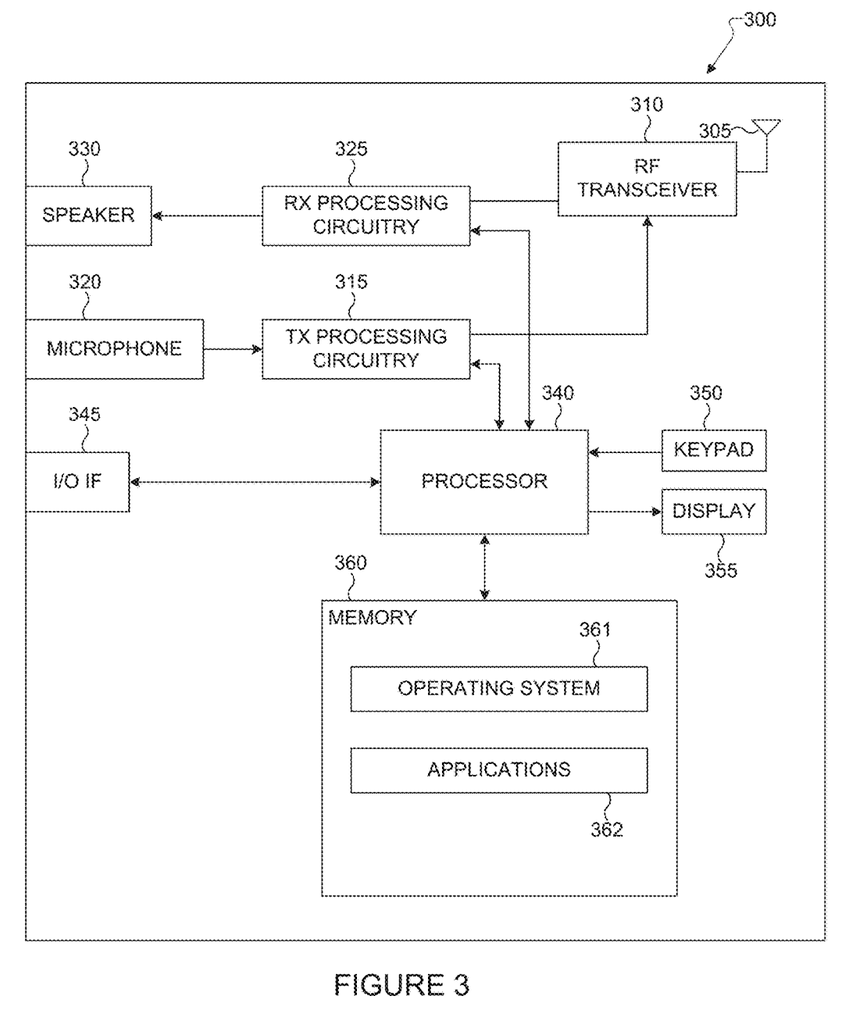

FIGS. 2 and 3 illustrate example devices in a communication system according to this disclosure. In particular, FIG. 2 illustrates an example server 200, and FIG. 3 illustrates an example client device 300. The server 200 could represent the server 104 in FIG. 1, and the client device 300 could represent one or more of the client devices 106, 108, 110, 112, or 114 in FIG. 1.

As shown in FIG. 2, the server 200 includes a bus system 205, which supports communication between at least one processor 210, at least one storage device 215, at least one communications unit 220, and at least one input/output (I/O) unit 225.

The processor 210 executes instructions that may be loaded into a memory 230. The processor 210 may include any suitable number(s) and type(s) of processors or other devices in any suitable arrangement. Example types of processors 210 include microprocessors, microcontrollers, digital signal processors, field programmable gate arrays, application specific integrated circuits, and discreet circuitry.

The memory 230 and a persistent storage 235 are examples of storage devices 215, which represent any structure(s) capable of storing and facilitating retrieval of information (such as data, program code, and/or other suitable information on a temporary or permanent basis). The memory 230 may represent a random access memory or any other suitable volatile or non-volatile storage device(s). The persistent storage 235 may contain one or more components or devices supporting longer-term storage of data, such as a ready only memory, hard drive, Flash memory, or optical disc.

The communications unit 220 supports communications with other systems or devices. For example, the communications unit 220 could include a network interface card or a wireless transceiver facilitating communications over the network 102. The communications unit 220 may support communications through any suitable physical or wireless communication link(s).

The I/O unit 225 allows for input and output of data. For example, the I/O unit 225 may provide a connection for user input through a keyboard, mouse, keypad, touchscreen, or other suitable input device. The I/O unit 225 may also send output to a display, printer, or other suitable output device.

Note that while FIG. 2 is described as representing the server 104 of FIG. 1, the same or similar structure could be used in one or more of the client devices 106-114. For example, a laptop or desktop computer could have the same or similar structure as that shown in FIG. 2.

As described in more detail below, the client device 300 and the server 200 can be used for multipath data packet transmission. For example, the client device 300 transmits a request to the server 200. The request includes an identifier that is unique to a multipath transmission session and that identifies two or more network access interfaces of the client device 300 to receive one or more data packets from the server 200 during the multipath transmission session. The client device 300 can also receive the one or more data packets from the server 200 through each of the two or more network access interfaces of the client device 300 during the multipath transmission session.

As shown in FIG. 3, the client device 300 includes an antenna 305, a radio frequency (RF) transceiver 310, transmit (TX) processing circuitry 315, a microphone 320, and receive (RX) processing circuitry 325. The client device 300 also includes a speaker 330, a processor 340, an input/output (I/O) interface (IF) 345, a keypad 350, a display 355, and a memory 360. The memory 360 includes an operating system (OS) program 361 and one or more applications 362.

The RF transceiver 310 receives, from the antenna 305, an incoming RF signal transmitted by another component in a system. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305. In an embodiment, the two or more network access interfaces can include one or more I/O IFs 345, one or more RF transceivers 310, or the like. The I/O IF 345 can communicate via a wired connection such as a network interface card for an Ethernet connection or a cable interface for a set top box. The RF transceivers 310 can communicate with a wireless access point (such as wireless access points 118 or 119), a base station (such as base stations 116 or 117), or the like.

The processor 340 can include one or more processors or other processing devices and execute the OS program 361 stored in the memory 360 in order to control the overall operation of the client device 300. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360. The processor 340 can move data into or out of the memory 360 as required by an executing process. In some embodiments, the processor 340 is configured to execute the applications 362 based on the OS program 361 or in response to signals received from external devices or an operator. The processor 340 is also coupled to the I/O interface 345, which provides the client device 300 with the ability to connect to other devices such as laptop computers and handheld computers. The I/O interface 345 is the communication path between these accessories and the processor 340.

The processor 340 is also coupled to the keypad 350 and the display unit 355. The operator of the client device 300 can use the keypad 350 to enter data into the client device 300. The display 355 may be a liquid crystal display or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIGS. 2 and 3 illustrate examples of devices in a communication system, various changes may be made to FIGS. 2 and 3. For example, various components in FIGS. 2 and 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the client device 300 configured as a mobile telephone or smartphone, client devices could be configured to operate as other types of mobile or stationary devices. In addition, as with computing and communication networks, client devices and servers can come in a wide variety of configurations, and FIGS. 2 and 3 do not limit this disclosure to any particular client device or server.

MMTP protocol in REF. 2 is an application layer protocol used for delivering both timed and non-timed multimedia data between an MMT sender and an MMT receiver. MMTP protocol describes the set of signaling messages and their message formats in addition to the payload packet formats for multimedia data delivery. MMTP protocol relies on transport layer services for actual data delivery. Transport connections (such as transmission control protocol (TCP) connections with TCP transport and user datagram protocol (UDP) flows with UDP transport) are setup between the MMT sender and MMT receiver for exchanging multimedia data. MMTP protocol uses signaling protocols such as Real Time Streaming Protocol (RTSP) or hypertext transfer protocol (HTTP) for setting up a MMTP session between an MMT sender and an MMT receiver.

Figure 4:
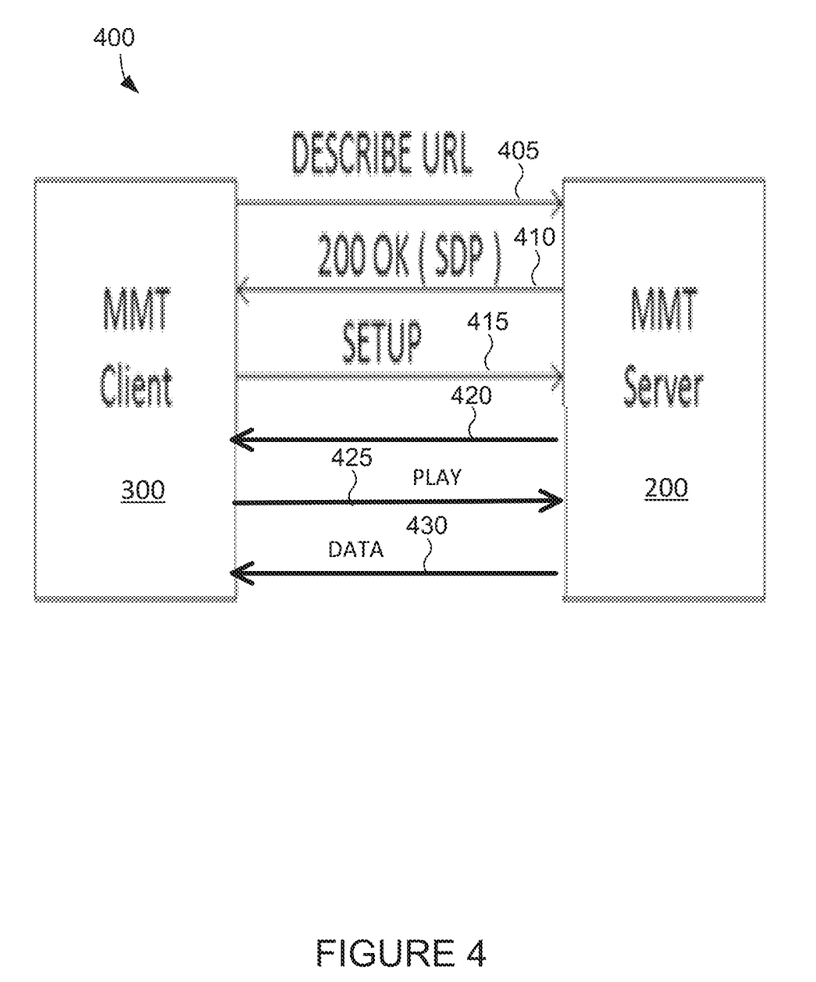
FIG. 4 illustrates an example method of an RTSP session between an MMT client and MMT server according to this disclosure.

FIG. 4 illustrates an example method 400 of an RTSP session between an MMT client (such as an MMT receiver) and MMT server (such as an MMT sender) according to this disclosure. At step 405, the client device 300 requests the server 200 to describe the URL for data delivery. At step 410, the server 200, in response to receiving the request from the client device 300 to describe the URL for data delivery, sends a body description using session description protocol (SDP) protocol. At step 415, the client device 300 sends a setup request using an RTSP SETUP message. The client device 300 can include in the SETUP message transport parameters such as a transport profile (that includes underlying transport), destination address, and client port in the transport header specifying through which one or more paths the client device 300 would like to receive the stream. At step 420, the server 200 responds with a reply (such as "200 OK") to the SETUP request with the server's 200 own set of transport parameters such as server port and destination address in the transport header. At step 425, the client device 300 requests the server 200 to play multimedia data using the transport connections that are setup. At step 430, the server 200 sends multimedia data to the client device 300 on the transport connections that are setup using the SETUP and corresponding reply messages. As shown below, an example SDP from a server 200 to the client 300 is provided that can be used during a session setup as specified in REF. 12.

v=0
o=user 6431641313 1 IN IP4 10.10.52.13
s=An MMTP session
t=1411639200 14277600
a=source-filter: incl IN IP4*10.10.52.13
m=application 12345 MMTP/UDP 100 101 102 103 104.
a=of:100 flowid=0 Signaling/PA
a=of:101 flowid=7623 MPU
a=of:102 flowid=7624 MPU a=of:103 flowid=7625 GF
a=of:104 flowid=7626 FEC As shown above, the client device 300 (such as an MMT client) and server 200 (such as an MMT server) can agree upon the type of media assets and the transport parameters on which those assets can be exchanged.

The signaling protocols are used for setting up the transport connections (TCP or UDP) using multimedia data that is exchanged between the server 200 and the client device 300. As can be shown in FIG. 4, the transport connections are one-to-one connections between the client device 300 and the server 200. The amount of multimedia data that can be transferred over the transport connections is limited to the capacity of the network interface used by the transport connection as well as the available bandwidth of the network connected to that network interface. As a result, the end user experience at the receiver depends upon the quality of the network path on which the transport connection is setup. If the network path does not perform well (such as because of high packet loss, congestion, or the like), the end user experience can be directly impacted with, for example, problems related to media buffering, pixilation, and the like.

To avoid such problems because of bad network paths, MMTP protocol can be enhanced with multipath capabilities. Multiple transport connections using multiple network interfaces can be established between the sender and the receiver so data can be sent faster and in a reliable fashion to the destination. Further, based on MMT receiver's feedback, the MMT sender can dynamically change the network path if the MMT sender identifies that one or more of the possible network paths are performing poorly.

Figure 5:
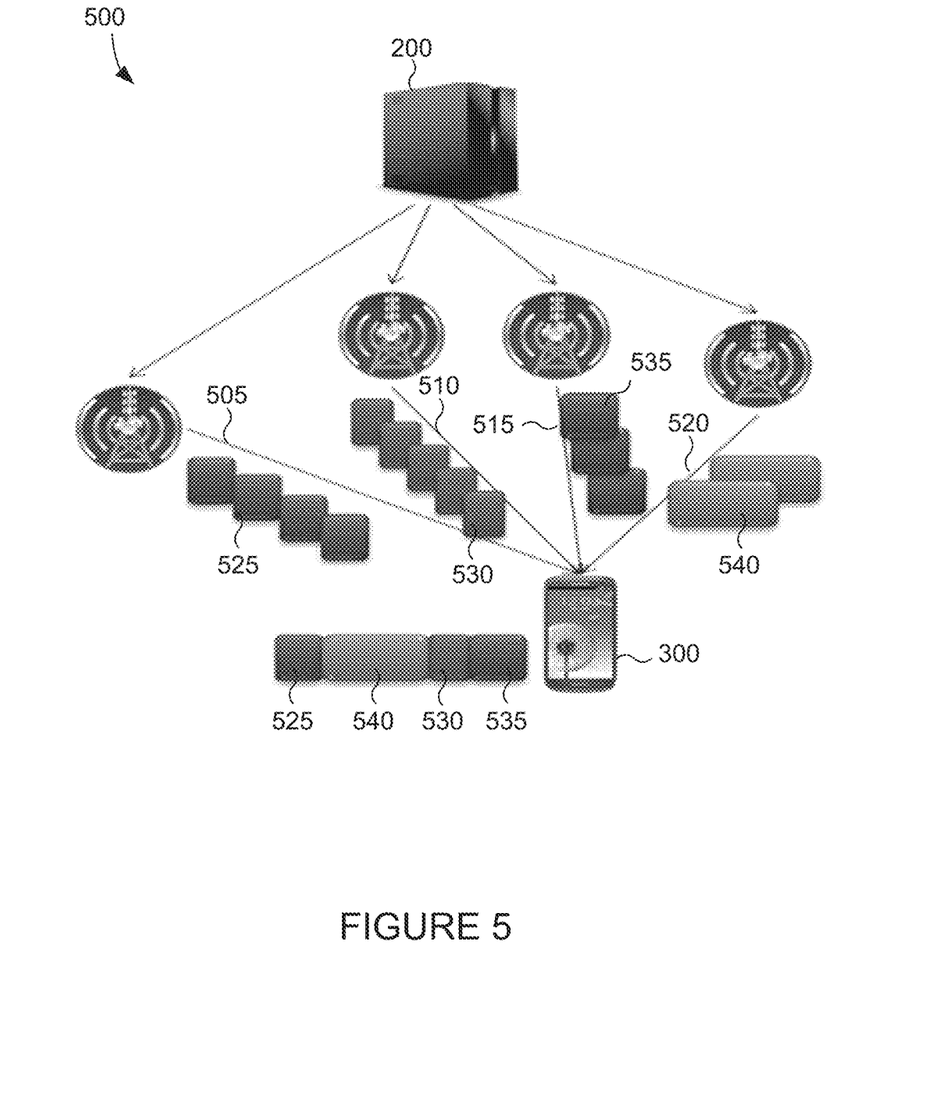
FIG. 5 illustrates an example architecture diagram for multipath delivery in MMT according to this disclosure.

FIG. 5 illustrates an example architecture diagram 500 for multipath delivery in MMT according to this disclosure. Multiple transport connections, 505, 510, 515, and 520 can be setup between the server 200 (such as an MMT sender) and a client device 300 (such as an MMT receiver) using different network interfaces available on the server 200 and the client device 300. Different packet flows 525, 530, 535, and 540 (such as different types of data packets) of the multimedia data stream can be transferred on different transport connections 505, 510, 515, and 520 thus using multiple network interfaces (such as paths) available for data delivery. If one network connection 505 (such as a path) performs poorly during the course of the session, a different network connection 510 (such as a different path) can be chosen for subsequent packet delivery. As a result, poor performance of one network path does not impact the overall quality of media delivery, and therefore has no adverse impact on the end user experience.

With multipath delivery, multiple network paths can be used for sending multimedia data from the server 200 to client device 300 and vice versa. Due to the availability of multiple network paths, more multimedia data can be transferred to the destination in the same amount of time. As a result, the net bandwidth available for data delivery is higher than any of the bandwidths of the individual network paths. As discussed herein, session management for multipath can use an RTSP signaling protocol. For example, the client device 300 and server 200 could mutually discover multipath capability support by sending OPTIONS requests to each other. As an OPTIONS request can be generated by both the server 200 and the client device 300, the OPTIONS request becomes a good candidate mode for enquiring about multipath feature support. A new option tag called "multipath" can be registered with internet assigned number authority (IANA) and can be implemented in the "require" header of an OPTIONS request. Below is an example of a simple OPTIONS request from a client device 300 to a server 200 enquiring about multipath support.

C→S: OPTIONS rtsp://one.com/m.mp4 RTSP/1.0
CSeq: 1|
Require: multipath

The response of the server 200 for OPTIONS request follows standard response mechanism as indicated in REF. 3 as shown below.

S→C: RTSP/1.0 200 OK
CSeq: 1
Public: DESCRIBE, SETUP, TEARDOWN, PLAY, PAUSE

The above OPTIONS request can be generated by the server 200 to enquire about multipath support from the client device 300 and the client device 300 can respond back with an appropriate response. The request and response will follow the standard OPTIONS request response mechanism as specified in REF. 3 with support of the above newly proposed option tag called "multipath." The client device 300 and the server 200 can start a session setup with multipath capabilities as discussed further herein. However, if both the server 200 and the client device 200 decide not to use multipath, they can continue with standard session setup procedure as indicated in REF. 3.

Figure 6:
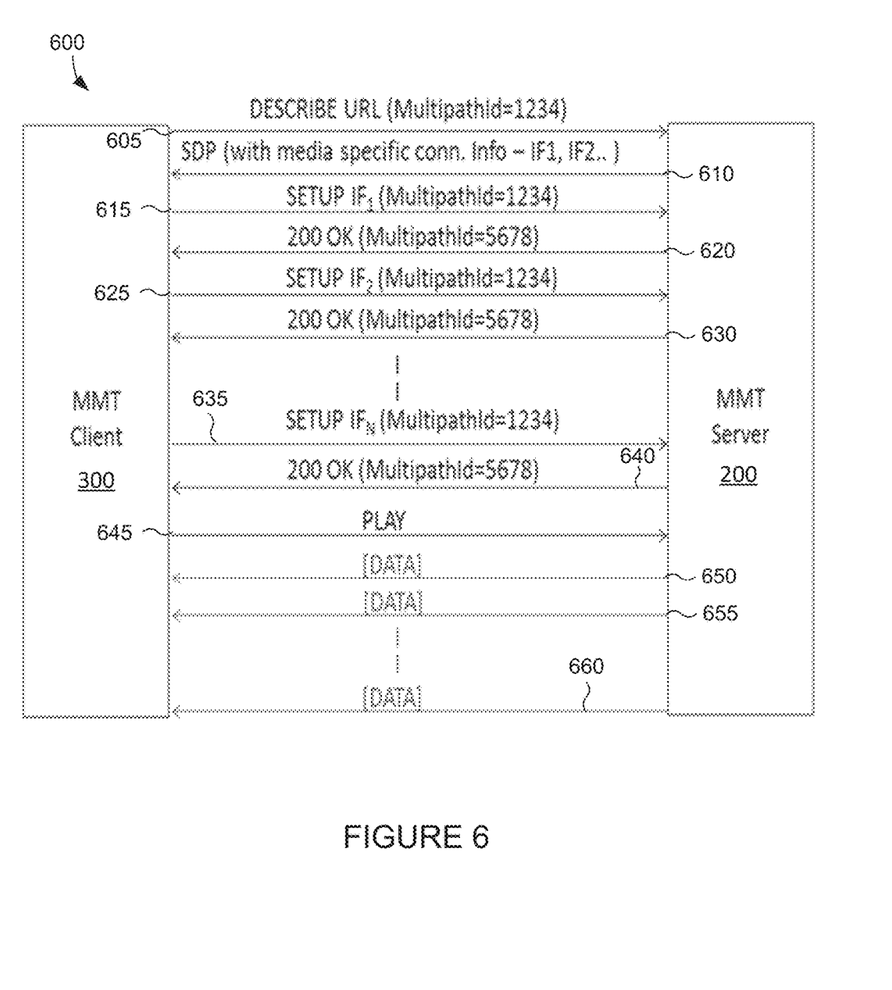
FIG. 6 illustrates an example method of an MMT session setup using RTSP protocol according to this disclosure.

In an embodiment, a session can be established between a client device 300 (such as an MMT client device) and a server 200 (such as an MMT server) using multipath capabilities. FIG. 6 illustrates an example method 600 of an MMT session setup using RTSP according to this disclosure. At step 605, the client device 300 requests for URL description from the server 200. The client device 300 includes a new header called "MultipathId" to indicate a session level unique identifier so that the server identifies all the connections that belong to the same multipath session from that client device 300. An example DESCRIBE is shown below.

C→S: DESCRIBE rtsp://one.com/m.mp4 RTSP/1.0
CSeq: 2
MultipathId: 1234

For the DESCRIBE request with a multipath identifier as shown above, at step 610, the server 200 can respond with an SDP having a new attribute called "multipath" to tell the client device 300 that the server 200 supports multipath delivery. The syntax of a multipath attribute is as shown below.

```
v=0
o=user 6431641313 1 IN IP4 10.10.52.13
s=An MMTP session
t=1411639200 1427277600
a=multipath:2                         <---- multipath attribute with
a=group:LS 1 2                        number of network paths
m=application 0 MMTP/UDP 100 101 102
a=mid:1
a=control:streamid=0
c=IN IP4 192.168.0.1                  <---- first media conn info
a=of:100 flowid=0 Signaling/PA
a=of:101 flowid=7623 MPU
a=of:102 flowid=7624 MPU
m=application 0 MMTP/UDP 100 103 104
a=mid:2
a=control:streamid=1
c=IN IP4 10.0.0.10                    <---- second media conn info
a=of:100 flowid=0 Signaling/PA
a=of:103 flowid=7625 GF
a=of:104 flowid=7626 FEC
```

As shown in the above SDPs, the media descriptions not only include connection information for each of the network interfaces, but also the type of data the party is willing to receive for each of the network interfaces. In addition, the SDP "control" attribute for each of the media descriptions binds the stream id (as indicated by a "streamid" parameter) to the media format (such as payload types) specified in the media lines. When the client device 300 reads this information, the client device 300 determines what asset types (such as asset types specified by a media format description such as payload types) can be served with each of the stream ids identified in the corresponding "control" attribute. As a result, the client device 300 determines which stream id to request for a given asset type and uses this stream id in the request URL of a SETUP request. With multipath delivery the client device 300 should generate a SETUP request from a network interface of client device's 300 choice. The generation of the SETUP request is governed by a policy of selecting which asset types have to be transmitted on which network interfaces. As a result, the chosen network interface combined with a URL (for example, with stream id info as shown above that corresponds to a particular asset type) is used by the client device 300 to generate requests for specific asset types on specific network interfaces. This brings an added advantage of using certain kinds of network interfaces (such as a WiFi connection with a higher bandwidth) with certain types of data (such as high quality video).

Based on the multipath SDP received from the server 200, the client device 300 can setup multiple connections (such as network paths) to the server 200 (such as an MMT server) using different network interfaces. For example, at steps 615, 625, and 635, the client device 300 uses SETUP messages to setup each network path. In each SETUP request, the client device 300 includes the transport parameters (such as a profile, destination address, client port, or the like) specifying which path the client device 300 would like to receive the media. In addition, the client device 300 also includes a new header called "MultipathId" in each of the SETUP requests to the server 200 and henceforth called "client multipath identifier." The value of this header field is the same as the value of "MultipathId" header field used in the DESCRIBE request discussed herein. Using the same value informs the server 200 that the SETUP requests from the client device 300 belong to the same session as the initial DESCRIBE request. In addition, the client multipath identifier from the client device 300 is bound to the network and transport parameters so the client device 300 can be later used to group packet flows from different network paths. All the SETUP requests include the "MultipathId" header field if the client device 300 and the server 200 would like to use multipath delivery.

Once the server 200 receives each SETUP message, at steps 620, 630, and 640, the server 200 can respond using the server's 200 own transport parameters in the reply message to specify where the server 200 would like to receive the media. Further, the server 200 also includes a new header called "MultipathId" that includes a value that is a unique value chosen by the server 200 and is henceforth called "server multipath identifier." This value tells the client device 300 that all connections from the server 200 with same server multipath identifier belong to the same session. In addition, the server multipath identifier is bound to the network and transport parameters so the server multipath identifier can be later used to group packet flows on different network paths. At the end of the SETUP request, response exchanges with all client SETUP requests having the same client multipath identifier and server responses having the same server multipath identifier, the client device 300 and the server 200 know which network paths belong to the same session.

Upon completion of all SETUP request response messages, at step 645, the client device 300 then requests to play the streams and the server 200 plays the streams on the negotiated transport connections using different network paths. Since the transport connection parameters were bound to the corresponding client device multipath identifier and server multipath identifier, at steps 650, 655, and 660, the client device 300 and the server 200 can now receive packet flows on different network paths and still be able to group or correlate flows from different network paths.

In an embodiment, a client device 300 (such as an MMT client device) and a server 200 can intend to enable or disable support for multipath during the session. In addition, the client device 300 or the server 200 can add or drop network paths during the session if they are already using multipath. When a client device 300 or a server 200 want to initiate multipath support during a session, either can open a transport connection (TCP or UDP) for packet data exchange using an RTSP signaling protocol without using multipath capabilities. For a client device 300 to initiate multipath, the client device 300 can issue an OPTIONS request to check the multipath capabilities of the server as discussed herein. Upon receiving an affirmative response from server for multipath capability, the client device 300 can issue a new SETUP request with modified transport parameters to enable multipath as described herein (an existing stream need not be terminated and reopened explicitly to modify transport parameters of the stream REF. 3. However, if a new interface is to be used, a new SETUP request is sent from that new interface with a "MultipathId" header. The value of this header is the same as the client multipath identifier that is being used in other connections.

For a server 200 to initiate multipath, the server 200 can check multipath capabilities by sending an OPTIONS request to the client device. The server 200 can then send an ANNOUNCE message to modify the media description to specify multipath capabilities (using SDP with multipath attribute). If the client device 300 elects to use multipath, the client device 300 can send multiple SETUP requests to enable multipath delivery as described herein.

In an embodiment, the client device 300 and the server 200 can add or drop a network path if either is already using multipath support. For example, the client device 300 send a new SETUP request with transport parameters and use the same value for the header field "Multipath" to add a new network path to existing multipath connection. The client device 300 can also drop a network path by issuing a TEARDOWN request for the corresponding SETUP request as specified in REF. 3. If the client device 300 intends to transport the packet flow of the soon-to-be-terminated network path on a different network path, the client device 300 can do so using a modified SETUP request for the other network path. As another example, the server 200 can add or drop network paths by announcing a new SDP and then by asking the client device 300 to setup connections based on the modified SDP.

The client device 300 and the server 200 can drop multipath support during the session. The client device 300 can do so by tearing down all existing network paths and then issuing a new SETUP request as specified in REF. 3. Optionally, the client device 300 can also terminate all but one connection and modify the remaining connection using a modified SETUP request. The server 200 can drop multipath support using a modified SDP (without the "multipath" attribute) in an ANNOUNCE message. Multiple network paths established using multipath support should be torn down one by one by following the single session termination mechanism described in REF. 3.

The support for multipath is mutually exclusive between the client device 300 and the server 200. In other words, the client device 300 and the server 200 can implement multipath irrespective of other's preference for multipath delivery. If either the client device 300 or the server 200 does not have multiple interfaces or would not like to use a multipath delivery feature, neither have to include the "MultipathId" header field in its outgoing messages. However, if the other device includes the "MultipathId" header, the device not utilizing multipath should be able to identify that the other device is requesting multipath support and therefore should be able to stream packet data to multiple interfaces of the other device.

Having setup multiple paths for data delivery as discussed herein, the MMT sender can use multiple paths to send the data to the MMT receiver. As the receiver is receiving data from multiple paths, the receiver can compute QoS and QoE measurements (such as packet loss, delay, jitter, or the like) on a network path level. To enable this, the packets can be stamped (either at the MMT sender or at an intermediate node on the path) with node or path information before they reach the receiver. The MMT receiver can compute per-flow or per-network path QoS and QoE measurements (path quality information) at predetermined intervals and send the path quality information along with any channel quality information (such as link radio quality on LTE link) to the MMT sender.

Figure 7:
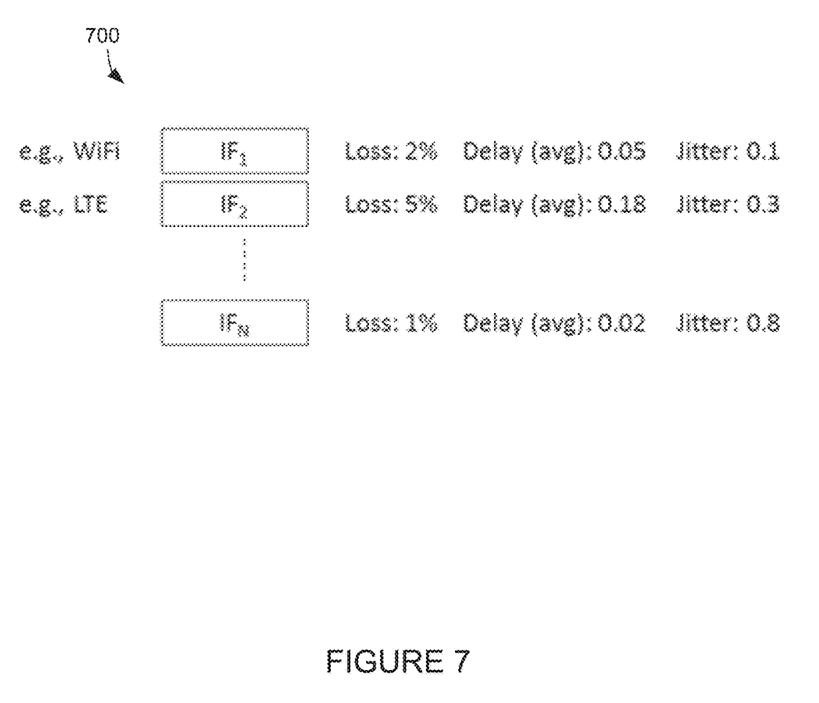
FIG. 7 illustrates an example of diagram of receiver feedback for each of a plurality of network paths according to this disclosure.

FIG. 7 illustrates an example of diagram 700 of receiver feedback for each of a plurality of network paths according to this disclosure. The figure shows three metrics (loss, delay, and jitter) for each network path. However, the receiver feedback can be extended to include more QoS and QoE metrics for each network path. The MMT specification may include the support for receiver feedback. In an embodiment, receiver feedback can be done on a network path level. As a result of receiver feedback, the MMT sender becomes aware of the conditions of different network paths.

Based on MMT receiver feedback, the MMT sender can have a complete view of the conditions of different network paths between the two parties. The sender can use per-flow (per-network path) QoS and QoE measurements to dynamically change the network path so packet flows can be routed through other network paths that are performing better. The determination of a network path for a particular media type happens in real time as the packets are being generated from raw data. As a result, packets may be delivered to the destination on a network path with better quality characteristics resulting in optimal or improved delivery to the receiver. It should be noted that if the application demands, the receiver feedback and subsequently the dynamic path update based on such feedback can be made at a very granular level (such as on a packet-by-packet basis).

It should also be noted that since the network paths for packet flows can be changed during the session, it will result in going out of sync with the SDP because the SDP has the media type tied to a network path. To address this problem, the MMT sender and MMT receiver can initiate a mid-session change to modify transport parameters and network paths as described herein before the packet flows are actually sent out on the new network path. In an embodiment, such changes to network paths can be done with appropriate thresholds to minimize frequent changes to network paths.

Multipath can be setup using a repeat DESCRIBE message. As discussed herein, a "MultipathId" header field can be included in the DESCRIBE message. The client device 300 might not have enquired about the multipath capabilities of the server 200 using the OPTIONS request before sending the DESCRIBE request. The client device 300 and the server 200 can still upgrade to multipath after the initial DESCRIBE request. For example, the client device 300 can ask the server 200 for a media description using a DESCRIBE request without the "MultipathId" header for setting up standard RTSP session as specified in REF. 3. The server 200 responds with a standard reply with body descriptions (SDP without "multipath" attribute). The client device 300 then intends to use multipath. The client device 300 can query the server 200 for multipath capabilities using an OPTIONS request as discussed herein. Upon receiving an affirmative response for multipath capability, the client device 300 can send a new DESCRIBE request, now with the "MultipathId" header field. The client device 300 and the server 200 can subsequently proceed with multipath delivery as described herein.

Multipath can also be setup based on a server announcement. As discussed herein, a "MultipathId" header field can be included in the DESCRIBE message. The client device 300 may not have enquired about the multipath capabilities of the server 200 using the OPTIONS request before sending a DESCRIBE request. The client device 300 and the server 200 can still upgrade to multipath after the initial DESCRIBE request. For example, the client device 300 asks the server 200 for a media description using a DESCRIBE request without the "MultipathId" header for setting up standard RTSP session as specified in REF. 3. The server 300 responds with a standard reply with body descriptions (SDP without "multipath" attribute). The client device 300 then intends to use multipath. The client device 300 can query the server 200 for multipath capabilities using an OPTIONS request as discussed herein. The server 200 can announce a new SDP using the ANNOUNCE message. Upon receiving an affirmative response for multipath capability and a new SDP, the client device 300 can start sending multiple SETUP requests with each request now having the "MultipathId" header field. The client device 300 and the server 200 will now proceed with multipath delivery as described herein.

A server 200 can initiate multipath. As discussed herein, a "MultipathId" header field can be included in the DESCRIBE message. The client device 300 may not have enquired about the multipath capabilities of the server 200 using the OPTIONS request before sending a DESCRIBE request. The client device 300 and the server 200 can still engage in multipath delivery even after the initial DESCRIBE request is sent to the server 200 and the server 200 initiates the multipath setup. For example, the client device 300 asks the server 200 for media description using a DESCRIBE request without the "MultipathId" header for setting up a standard RTSP session as specified in REF. 3. The server 200 sees that the client device 300 did not specify the "MultipathId" header. The server 200 can still respond back with an SDP including the "multipath" SDP attribute. The server 200 can also send the server multipath identifier value in the response to the DESCRIBE request. The client device 300 sees that the specified multipath capabilities of the server 200. Now the client device 300 can start setting up multiple connections as described herein. Beginning with the first SETUP message, the client device 300 can start including the client multipath identifier value in a "MultipathId" header field and then proceed with using multipath as described herein.

Figure 8:
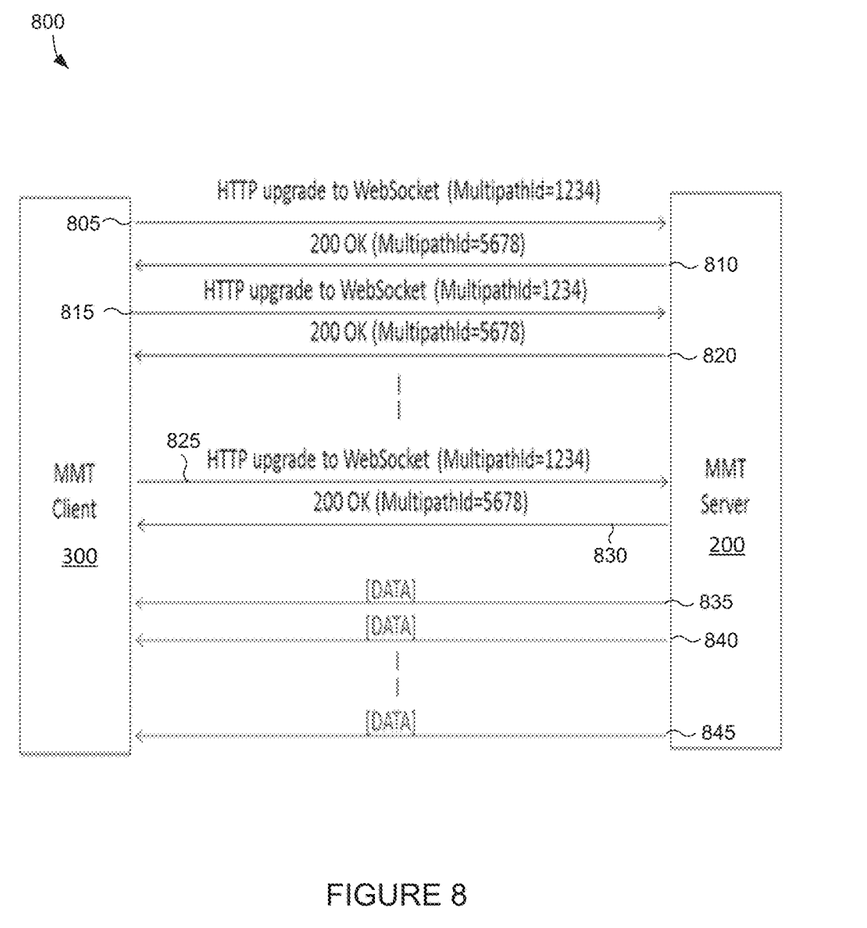
FIG. 8 illustrates an example method of an MMT session setup using HTTP protocol according to this disclosure.

HTTP can be used as a signaling protocol for setting up multipath sessions. A discussed herein, RTSP is used as a signaling protocol to set up multipath sessions. Alternatively, HTTP can be used as a signaling protocol to set up multipath sessions. FIG. 8 illustrates an example method 800 of an MMT session setup using HTTP protocol according to this disclosure. At step 805, the client device 300 downloads the MMT package from the server 200 using an HTTP upgrade to a WebSocket connection as specified in REF. 11. As part of the upgrade request, the client device 300 includes a "MultipathId" header to tell the server 200 that the client device 200 intends to use a multipath delivery feature. The value of this header field is the client multipath identifier that the client device 300 intends to use across all subsequent packet requests. At step 810, the server 200 sends a reply "200 OK" with a "MultipathId" header with the server multipath identifier value to the client device 300 in response to receiving the HTTP upgrade to WebSocket. A shown in steps 815 and 825, the client device 300 uses WebSocket connection for each of the interfaces that the client device 300 is using for multipath delivery. At steps 820 and 830, the server 200 sends a reply "200 OK" with a "MultipathId" header with the server multipath identifier value to the client device 300 in response to receiving the HTTP upgrade to WebSocket for each of the interfaces that the client device 300 is using for multipath deliver. Each GET request includes the "Multipath" header field so the server 200 knows that multiple incoming GET requests are part of the same session for MMT packet data. WebSocket messages will be used for options discovery such as multipath capability, negotiation of asset types for a given network interface and the like. At steps 835, 840, and 845 data is transmitted from the server 300 to the client device 200 through the respective paths.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A client device for multipath data packet reception, the client device comprising:
a group of two or more network access interfaces; and
a processor configured to:
control a transmission of a message to a server, wherein the message includes an identifier that is unique to a multipath transmission session and that identifies the group of two or more network access interfaces of the client device to receive one or more data packets from the server during the multipath transmission session,
control a reception of the one or more data packets from the server through any combination of the two or more network access interfaces of the client device during the multipath transmission session based on one or more characteristics of the two or more network access interfaces,
control a second transmission of a subsequent message to the server, after the reception of the one or more data packets from the server through the two or more network access interfaces of the client device during the multipath transmission session, wherein the subsequent message includes a request to change a type and amount of data packets to be received over the two or more network access interfaces of the client device and wherein the two or more network access interfaces are identified by the identifier that is unique to the multipath transmission session; and
control a second reception of one or more subsequent data packets from the server through each of the two or more network access interfaces of the client device during multipath transmission session.

2. The client device of claim 1, wherein the one or more characteristics include at least one of a path quality or a channel quality.

3. The client device of claim 1, wherein the processor is further configured to:
determine one or more characteristics of a first network path accessed by a first network access interface of the two or more network access interfaces of the client device; and
determine one or more characteristics of a second network path accessed by a second network access interface of the two or more network access interfaces of the client device.

4. The client device of claim 1, wherein the processor is further configured to generate data path identifiers that identify network paths accessed by a network access interface of the two or more network access interfaces of the client device during the multipath transmission session.

5. The client device of claim 4, wherein the processor is further configured to control a transmission of the one or more characteristics of the two or more network access interfaces together with the corresponding data path identifiers to the server.

6. The client device of claim 3, wherein the processor is further configured to:
determine which types of data packets are to be received through each of the network access interfaces of the client device based on a first channel quality and a second channel quality; and
before the transmission of the message to server including the identifier, include which types of data packets are to be received through each of the group of two or more network access interfaces of the client device.

7. The client device of claim 1, wherein the subsequent message includes the identifier that is unique to the multipath transmission session and that identifies a subsequent group of two or more network access interfaces of the client device, that is different from the group of two or more network access interfaces of the client device, to receive one or more subsequent data packets from the server during the multipath transmission session.

8. The client device of claim 1, wherein the processor is further configured to control the reception of the one or more data packets from the server through each of the two or more network access interfaces of the client device during the multipath transmission session in response to controlling a transmission of a request to receive the one or more data packets from the server during the multipath transmission session.

9. A server comprising:
a communications interface configured to receive a message from a client device and transmit one or more data packets to a client device;
a processor operably connected to the communications interface, wherein the processor is configured to:
control a reception of a message from the client device, wherein the message includes an identifier that is unique to a multipath transmission session and that identifies a group of two or more network access interfaces of the client device to receive one or more data packets from the server during the multipath transmission session;

control a transmission of the one or more data packets to the client device through network paths that correspond to the two or more network access interfaces of the client device during the multipath transmission session, control a second reception of a subsequent message from the client device, after the transmission of the one or more data packets through the network paths that correspond to the two or more network access interfaces of the client device during the multipath transmission session, wherein the subsequent message includes a request to change a type and amount of data packets to be received over the two or more network access interfaces of the client device and wherein the two or more network access interfaces are identified by the identifier that is unique to the multipath transmission session; and control a second transmission of one or more subsequent data packets from the client device through each of the two or more network access interfaces of the client device during multipath transmission session.

10. The server of claim 9, wherein the processor is further configured to control the transmission of the one or more data packets to the client device through each of the two or more network access interfaces based on received characteristics of the network paths.

11. The server of claim 9, wherein the processor is further configured to control path selection of a network path for data transmission of the one or more data packets based on requests from the client device for the multipath transmission session.

12. The server of claim 9, wherein the processor is further configured to:
control a transmission of a message to the client device, wherein the message indicates that the server is capable of supporting multipath data packet communication;
receive a request for a multipath transmission session; and
control a transmission of the one or more data packets to the client device from two or more network access interfaces of the server and through each of the two or more network access interfaces of the client device during the multipath transmission session.

13. The server of claim 10, wherein the one or more characteristics include at least one of a path quality or a channel quality.

14. The server of claim 9, wherein the processor is further configured to:
determine one or more characteristics of a first network path accessed by a first network access interface of the two or more network access interfaces of the client device; and
determine one or more characteristics of a second network path accessed by a second network access interface of the two or more network access interfaces of the client device.

15. The server of claim 14, wherein the processor is further configured to generate data path identifiers that identify network paths accessed by a network access interface of the two or more network access interfaces of the client device during the multipath transmission session.

16. The server of claim 14, wherein the processor is further configured to:
determine which types of data packets are to be received through each of the network access interfaces of the client device based on a first channel quality and a second channel quality; and
before the transmission of the message to server including the identifier, include which types of data packets are to be received through each of the group of two or more network access interfaces of the client device.

17. The server of claim 9, wherein subsequent message includes the identifier that is unique to the multipath transmission session and that identifies a subsequent group of two or more network access interfaces of the client device, that is different from the group of two or more network access interfaces of the client device, to transmit one or more subsequent data packets from the server during the multipath transmission session.

18. The server of claim 9, wherein the processor is further configured to control the transmission of the one or more data packets from the server through each of the two or more network access interfaces of the client device during the multipath transmission session in response to controlling a reception of a request to receive the one or more data packets from the client device during the multipath transmission session.

19. A method implemented using a client device for multipath data packet reception, the method comprising:
transmitting, by the client device, a message to a server, wherein the message includes an identifier that is unique to a multipath transmission session and that identifies a group of two or more network access interfaces of the client device to receive one or more data packets from the server during the multipath transmission session;
receiving, by the client device, the one or more data packets from the server through each of the two or more network access interfaces of the client device during the multipath transmission session based on one or more characteristics of the two or more network access interfaces;
transmitting, by the client device, a subsequent message to the server, after receiving the one or more data packets from the server through the two or more network access interfaces of the client device during the multipath transmission session, wherein the subsequent message includes a request to change a type and amount of data packets to be received over the two or more network access interfaces of the client device and wherein the two or more network access interfaces are identified by the identifier that is unique to the multipath transmission session; and
receiving, by the client device, one or more subsequent data packets from the server through each of the two or more network access interfaces of the client device during multipath transmission session.

20. The method of claim 19, wherein the one or more characteristics include at least one of a path quality or a channel quality.

21. The method of claim 19, further comprising:
determining, by the client device, one or more characteristics of a first network path accessed by a first network access interface of the two or more network access interfaces of the client device; and
determining, by the client device, one or more characteristics of a second network path accessed by a second network access interface of the two or more network access interfaces of the client device.

* * * * *